Jan. 7, 1936.　　　　　M. T. ZEIGLER　　　　　2,027,010
ICE WRAPPING MACHINE
Filed July 30, 1931　　　9 Sheets-Sheet 4
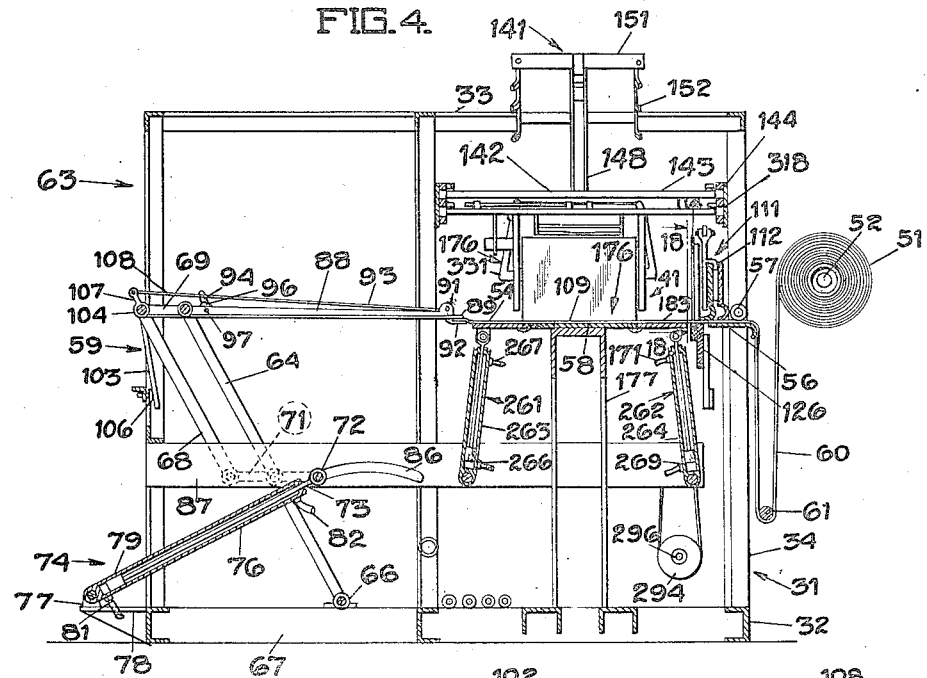
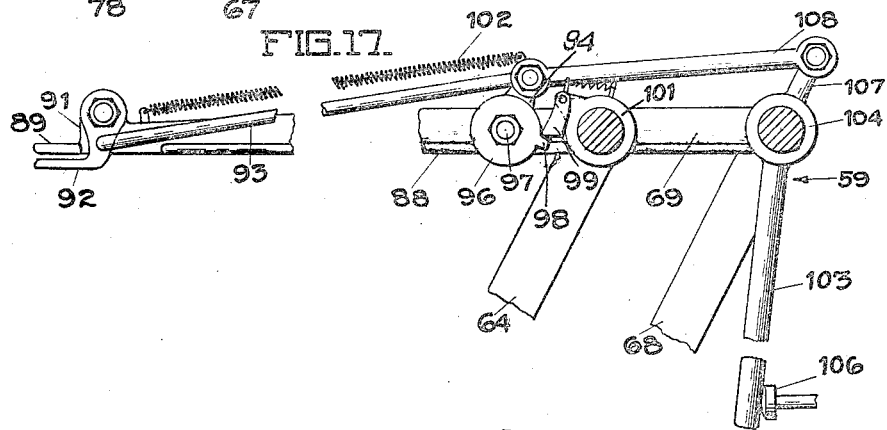
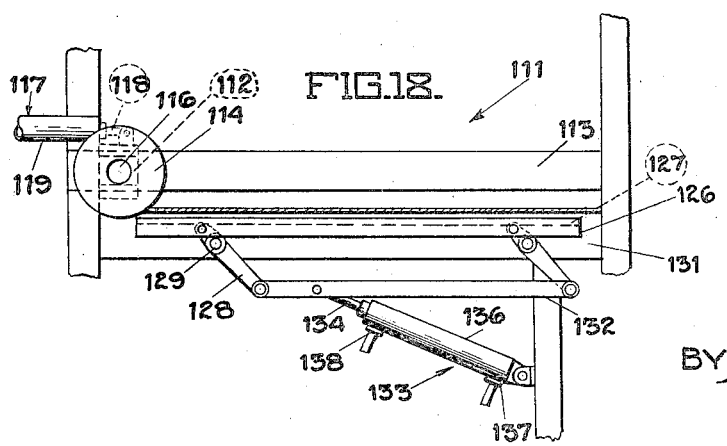
INVENTOR
M.T. ZEIGLER
BY Hazard and Miller
ATTORNEYS Jan. 7, 1936.         M. T. ZEIGLER         2,027,010
ICE WRAPPING MACHINE
Filed July 30, 1931         9 Sheets-Sheet 5
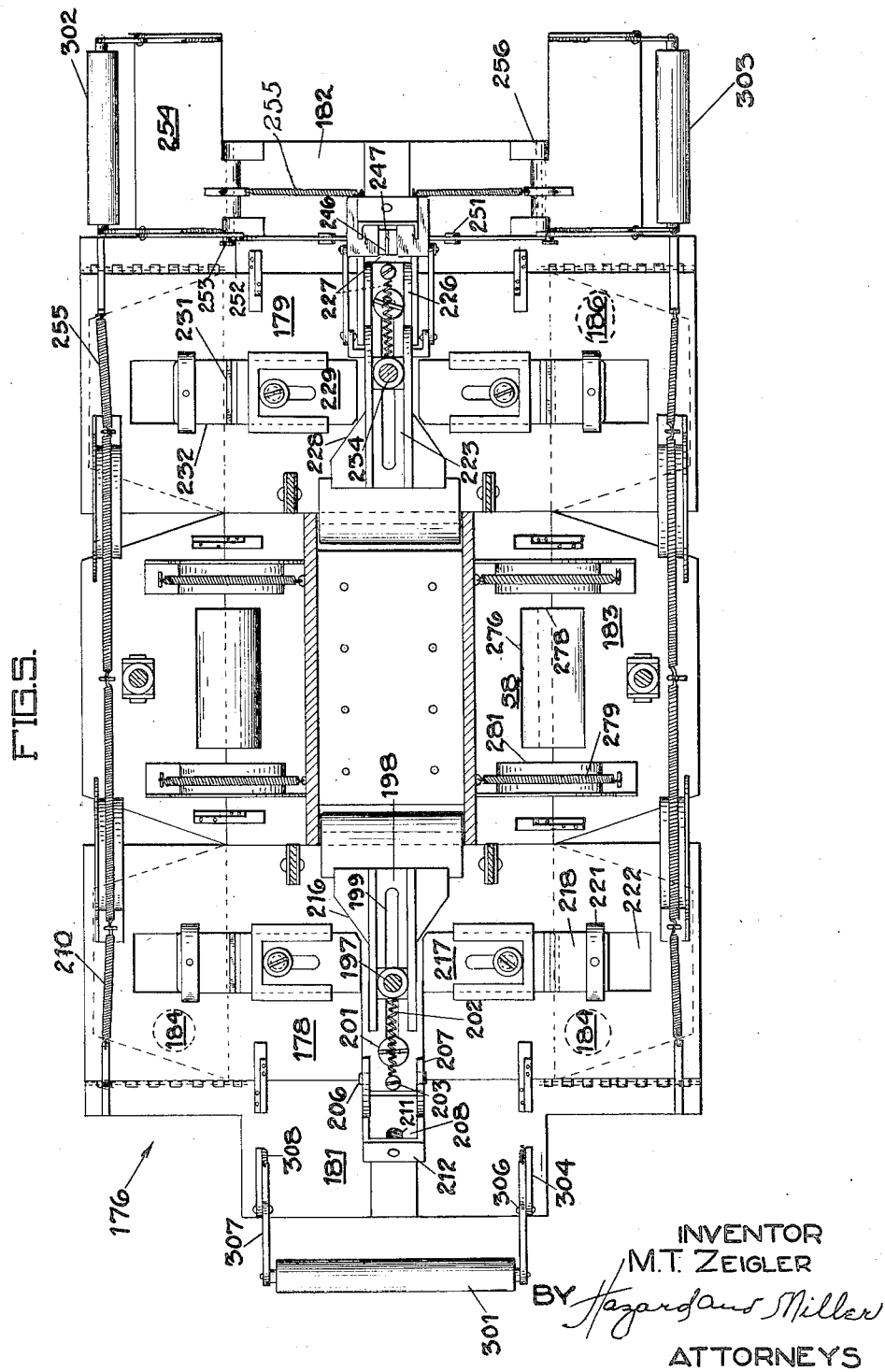
INVENTOR
M.T. ZEIGLER
BY Hazard and Miller
ATTORNEYS

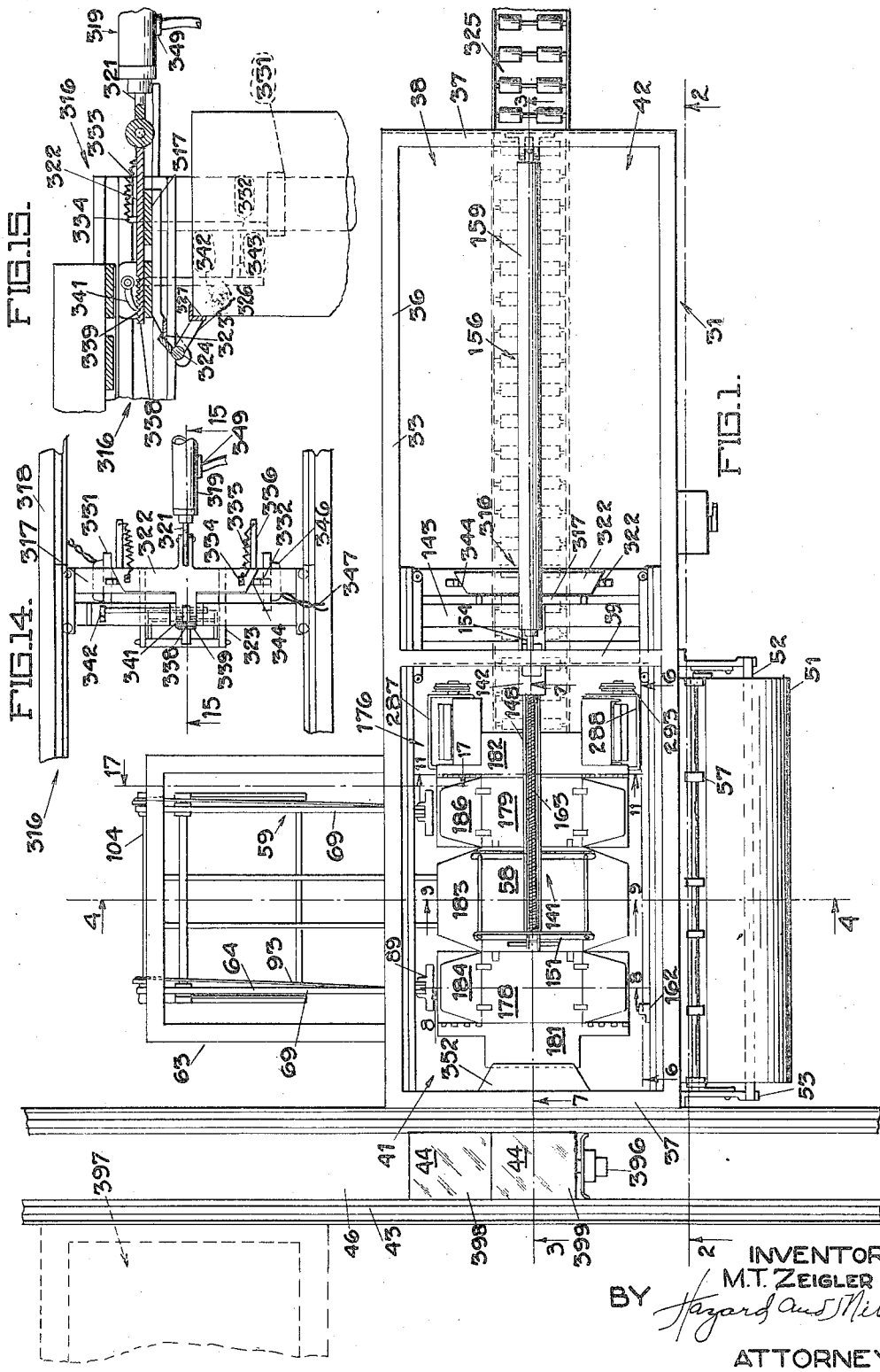

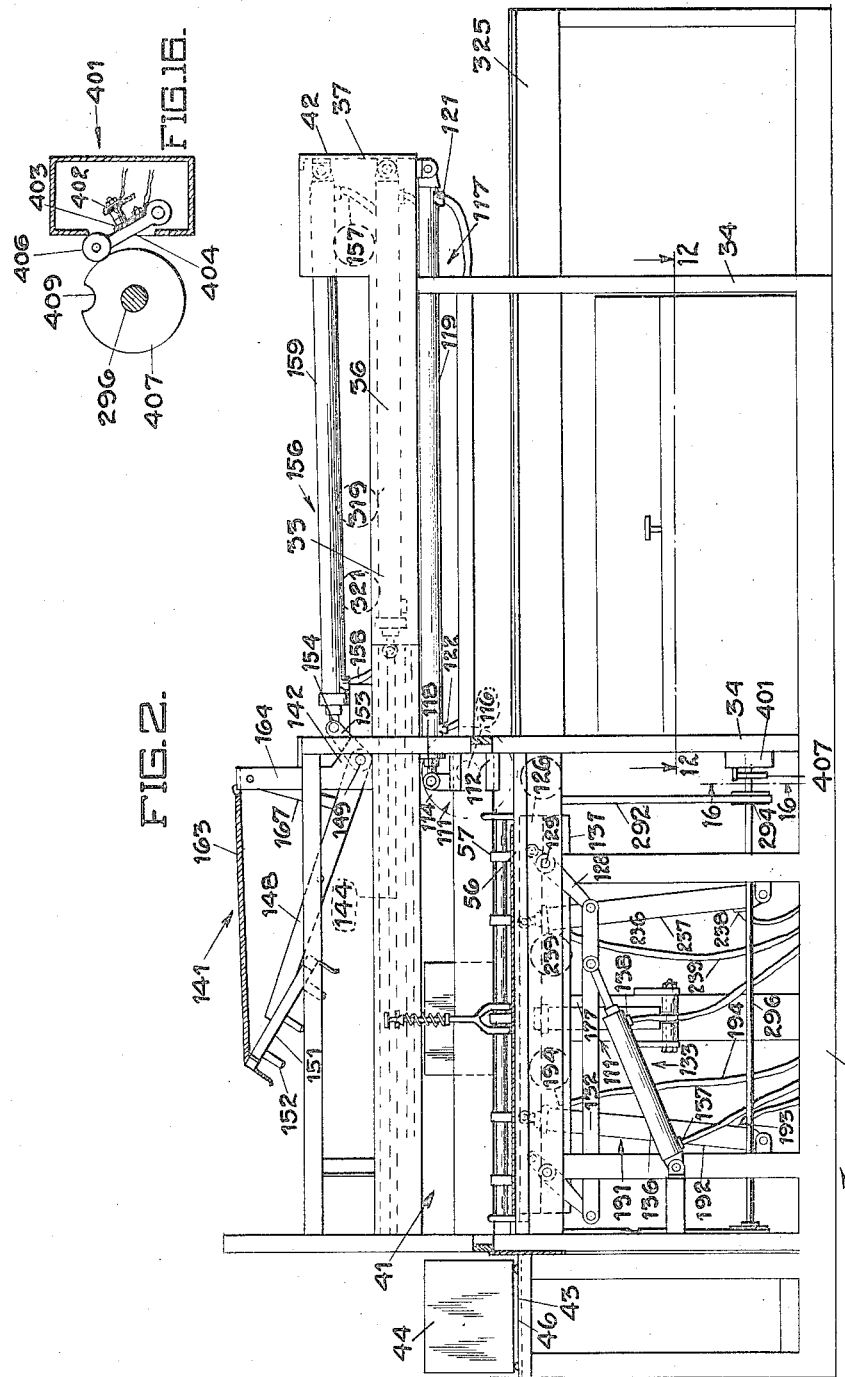

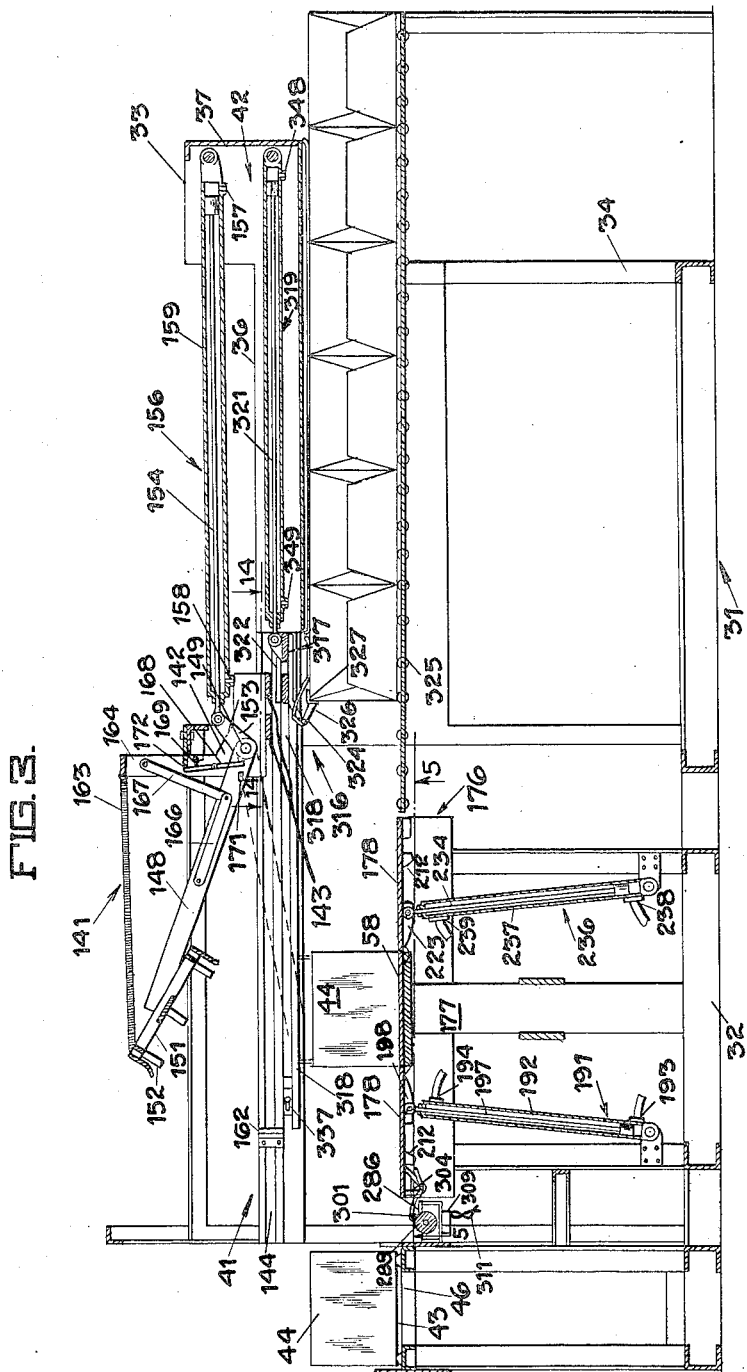

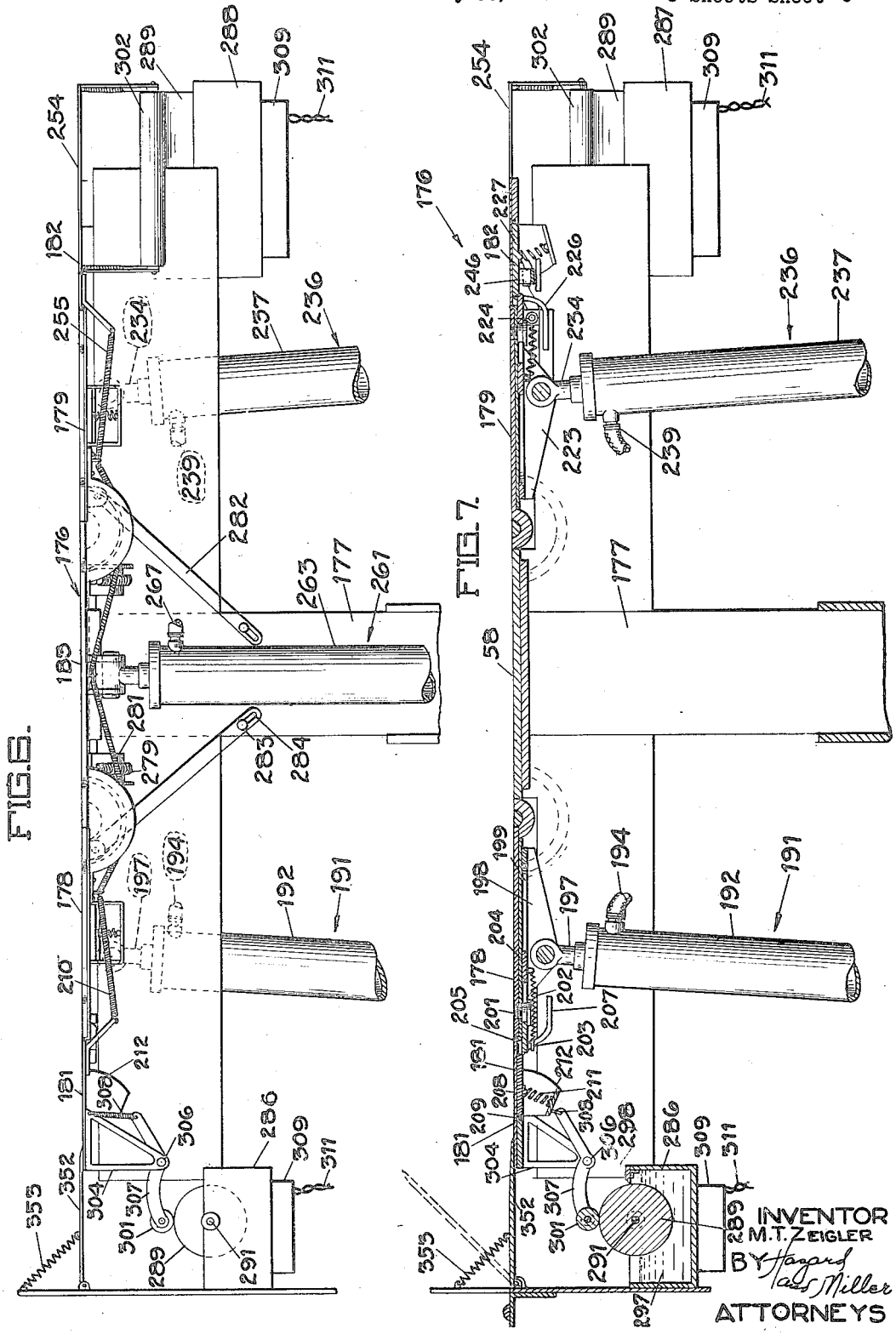

Jan. 7, 1936.    M. T. ZEIGLER    2,027,010
ICE WRAPPING MACHINE
Filed July 30, 1931    9 Sheets-Sheet 7
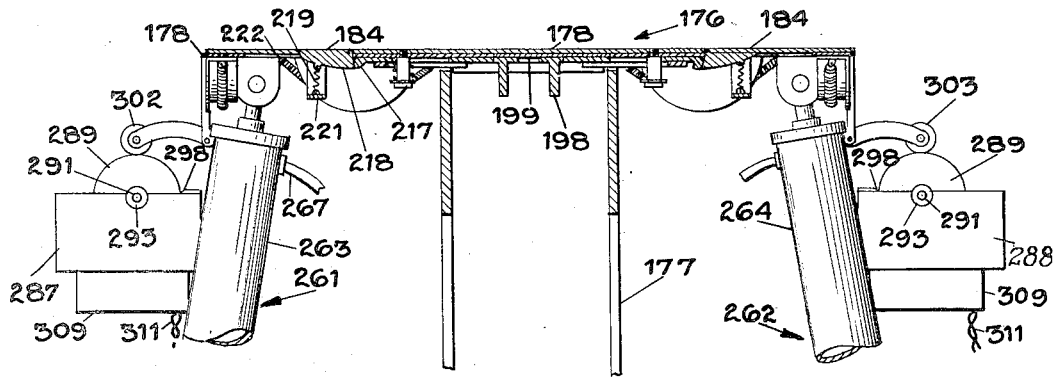
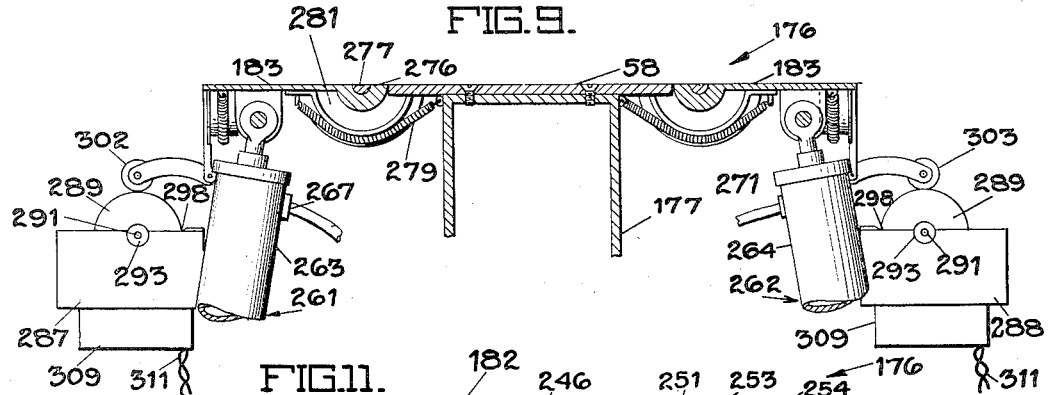
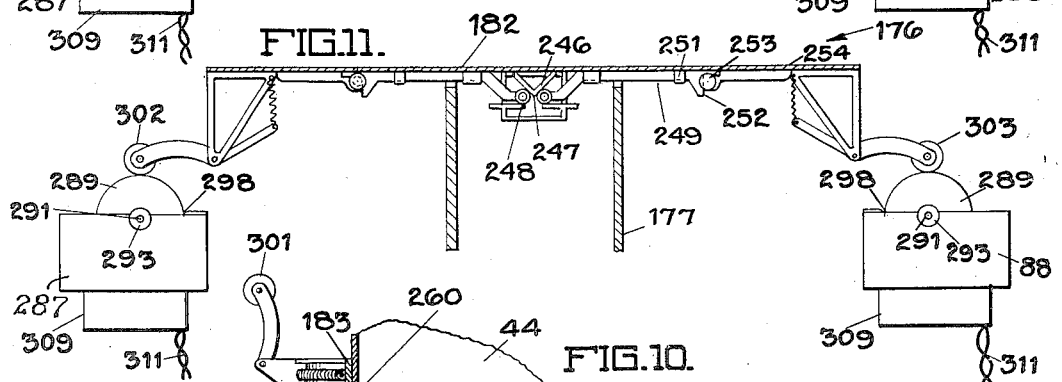
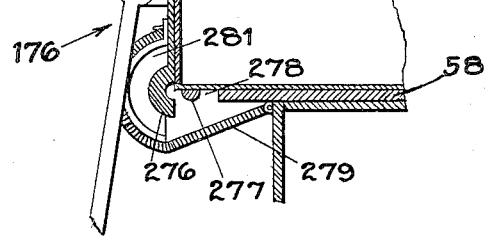
INVENTOR
M. T. ZEIGLER
BY Hazard and Miller
ATTORNEYS Jan. 7, 1936.  M. T. ZEIGLER  2,027,010

ICE WRAPPING MACHINE

Filed July 30, 1931  9 Sheets-Sheet 8

INVENTOR
M.T. ZEIGLER
BY Hazard and Miller
ATTORNEYS

Jan. 7, 1936. M. T. ZEIGLER 2,027,010
ICE WRAPPING MACHINE
Filed July 30, 1931 9 Sheets-Sheet 9
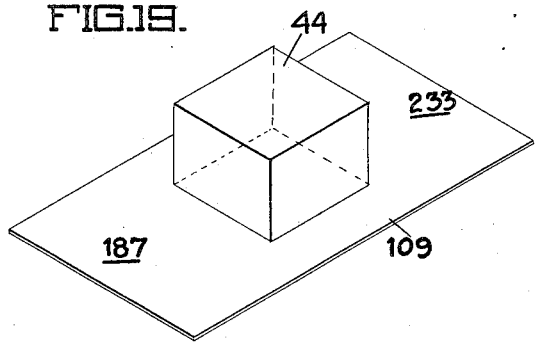
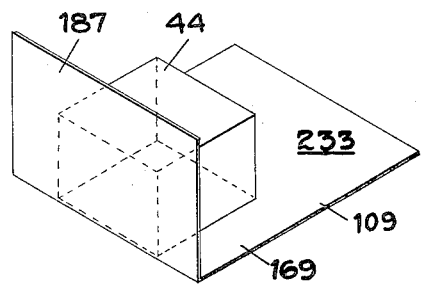
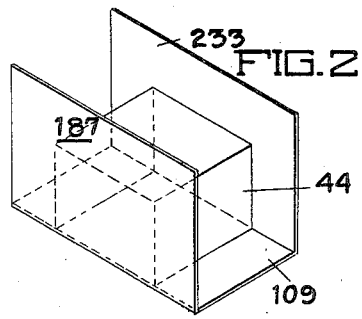
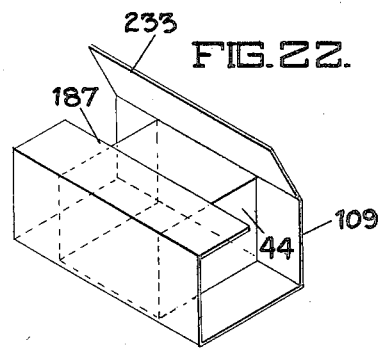
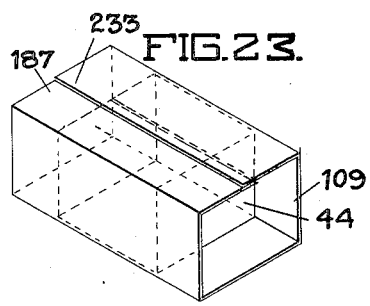
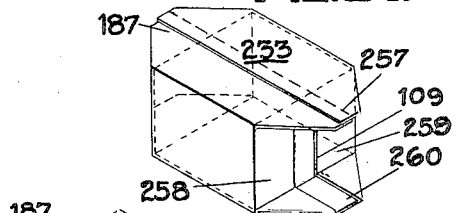
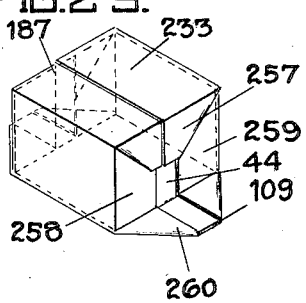
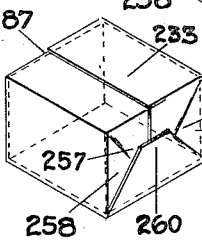
INVENTOR
M.T. ZEIGLER
BY Hazard and Miller
ATTORNEYS Patented Jan. 7, 1936

2,027,010

UNITED STATES PATENT OFFICE 2,027,010

ICE WRAPPING MACHINE

Maxwell T. Zeigler, Huntington Park, Calif., assignor, by mesne assignments, to Zeigler Packaged Ice Machinery Corporation, Huntington Park, Calif., a corporation of California Application July 30, 1931, Serial No. 554,142

24 Claims. (Cl. 93—2)

This invention relates to wrapping machines, and has for an object the provision of a wrapping machine which is designed primarily for wrapping substantially cubical blocks of ice, although the machine of the present invention is susceptible to modifications adapting it for wrapping other classes of goods.

One of the important objects of the present invention is to provide a wrapping machine in which special provision is made for variation in the dimensions of the blocks of ice to be wrapped, insuring neat folding of the paper or other wrapping material, about the block, and the establishment of adequate bond between predetermined areas of the wrapping material, so as to insure retention of the wrapping material upon the article after its release from the wrapping machine.

Another object is to provide means for applying heat to the reservoirs wherein the adhesive is stored, and means for applying heat to those areas of the wrapping material to which adhesive has been applied, after completion of the wrapping process.

Another object is to provide a wrapping machine having the general characteristics hereinabove set forth, which is adapted to be operated by a plurality of properly synchronized fluid motors, all of which receive their energizing fluid from a common source, and are controlled by cam-operated valves which are easily adjustable, whereby accurate synchronization of the operation of the several motors with respect to each other may easily be attained.

Another object is to so construct the valves, cams, and operating means hereinabove referred to, that they are continually immersed in a bath of oil, this oil also serving as the source of supply to the pressure pump whereby the several fluid motors are operated.

A further object is to provide a wrapping machine capable of carrying out its manifold operations—for example, placing a sheet of wrapping material in position to receive an article to be wrapped, placing the article upon the sheet, folding the sheet around the article, applying adhesive to predetermined areas of the sheet during the folding operation, pressing these areas against other areas of the sheet, and removing the wrapped article from the machine—with a high degree of efficiency and within a very short space of time, and without damage to the article itself.

A still further object is to provide a control mechanism for starting and stopping the wrapping machine, which adapts it to receive articles to be wrapped from a conveyor mechanism which also supplies one or more other wrapping machines, and which insures that an article to be wrapped will be held stationary in position to be taken into each of the several wrapping machines at the time of commencement of operation thereof.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 1 is a top plan view of a wrapping machine embodying the principles of the present invention, and showing conveyors whereby articles to be wrapped are conducted to and from the wrapping machine. In conjunction with the conveyor a portion of a second wrapping machine is indicated in dashed lines to indicate the method of cooperation between a plurality of machines fed by a single conveyor.

Fig. 2 is a longitudinal vertical sectional view taken upon the line 2—2 of Fig. 1, with the direction of view as indicated.

Fig. 3 is a longitudinal vertical sectional view taken upon the line 3—3 of Fig. 1, with the direction of view as indicated.

Fig. 4 is a transverse vertical sectional view taken upon the line 4—4 of Fig. 1, with the direction of view as indicated.

Fig. 5 is a horizontal sectional view taken below and looking upwards toward the supporting platform and paper-folding plates of the wrapping machine. The plane of section is indicated by the line 5—5 of Fig. 3 and the direction of view by the arrows.

Fig. 6 is an enlarged longitudinal vertical sectional view taken upon the line 6—6 of Fig. 1, with the direction of view as indicated, to show the paper-folding elements.

Fig. 7 is a view similar to Fig. 6 taken upon the line 7—7 of Fig. 1, with the direction of view as indicated.

Fig. 8 is a transverse vertical sectional view taken through the paper-folding elements, upon the line 8—8 of Fig. 1, with the direction of view as indicated.

Fig. 9 is a view similar to Fig. 8 taken upon the line 9—9 of Fig. 1, with the direction of view as indicated.

Fig. 10 is a detail view similar to Fig. 9, showing one of the end plates swung upwards to paper-folding position. A portion of the figure is broken away to reduce its length.

Fig. 11 is a view similar to Fig. 8 taken upon the line 11—11 of Fig. 1, with the direction of view as indicated.

Fig. 14 is an enlarged horizontal sectional view of a portion of the mechanism for withdrawing an article from the wrapping machine subsequent to completion of the wrapping process. The plane of section is indicated by the line 14—14 of Fig. 3, with the direction of view as indicated.

Fig. 15 is a longitudinal sectional view taken upon the line 15—15 of Fig. 14, with the direction of view as indicated.

Fig. 16 is an enlarged detail view in transverse vertical section, taken upon the line 16—16 of Fig. 2, with the direction of view as indicated, to show the holding switch which insures energization of the operating motor of the machine throughout a complete cycle of operation.

Fig. 17 is an enlarged detail view in transverse vertical section taken upon the line 17—17 of Fig. 1, to show the mechanism for drawing a sheet of paper across the supporting platform to position it in readiness to receive an article to be wrapped. A portion of the figure is broken away to reduce its length.

Fig. 18 is an enlarged detail view in longitudinal vertical section, showing the mechanism for severing a predetermined length of paper from its source of supply. The plane of section is taken upon the line 18—18 of Fig. 4, with the direction of view as indicated.

Figure 12:
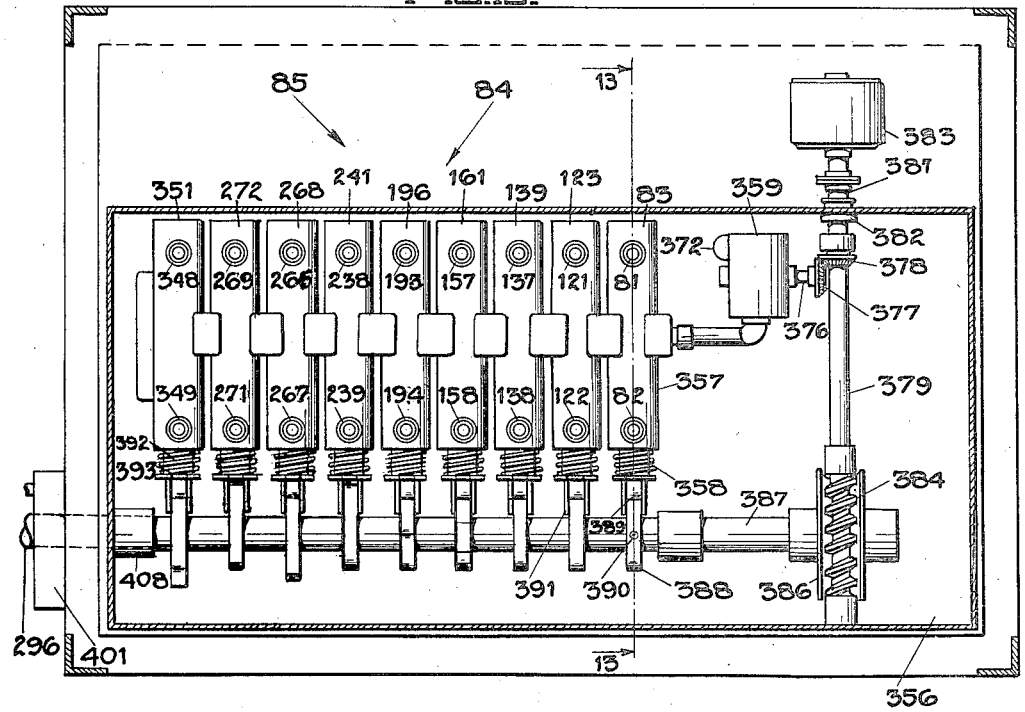
Fig. 12 is a horizontal sectional view taken upon the line 12—12 of Fig. 2, with the direction of view as indicated, to show the hydraulic mechanism for supplying actuating fluid under pressure to the several fluid motors which operate the various elements of the wrapping machine.

Figs. 19 to 26 inclusive are diagrammatic views in perspective, showing the position of the wrapping paper with respect to the article being wrapped, during successive steps of the wrapping operation.

In terms of broad inclusion, the wrapping machine of the present invention comprises a supporting platform adapted to receive first a sheet of suitable wrapping material such as a heavy kraft paper, means for positioning an article to be wrapped upon the upper surface of the paper thus positioned, and a plurality of paper-folding elements adapted to wrap the paper neatly about the article. In the event that the paper is not previously provided with adhesive, the wrapping machine itself is provided with mechanism for applying glue or other suitable adhesive material to predetermined areas of the sheet during the wrapping operation, and means for pressing these areas against other areas of the sheet so as to establish suitable bond therebetween to retain the paper wrapper upon the article. Upon completion of the wrapping operation, the wrapped article is withdrawn from the supporting platform to make room for the next sheet of paper and article to be wrapped.

Means are provided for automatically starting operation of the machine when an article to be wrapped is conducted by a suitable conveyor to that position from which it may be taken into the wrapping machine, and this starting mechanism is so constructed and arranged that it may be adapted to a plurality of wrapping machines, all of which are fed by a single conveyor. The starting mechanism preferably is common to all of the several wrapping machines, so that they will simultaneously draw an article to be wrapped from the conveyor, thus insuring that an article is stationary and properly positioned in registry with the entrance to each of the several wrapping machines before the machines start to operate.

As stated hereinabove, the machine of the present invention, while being susceptible for use in wrapping any type of substantially rectangular article, has been particularly designed for wrapping blocks of ice. When put to such use the machine preferably will be installed within a refrigerated room, so as to avoid melting of the ice during the wrapping operation and during conveyance of the blocks of ice to and from the wrapping machine. Under such circumstances, I prefer to provide means for keeping the adhesive reservoirs warmed to a suitable temperature to assure proper fluidity of the adhesive. I have also found it desirable to provide means for applying heat to those areas of the wrapping paper to which adhesive has been applied, and subsequent to the wrapping process, so as to insure setting of the adhesive before the wrapped article is removed from the machine, thereby preventing the possibility of loosening of the paper and subsequent partial or complete unwrapping of the article.

Specifically describing that embodiment of my invention which at present appears to be the most practical, my improved wrapping machine is mounted upon a frame 31, which comprises sills 32 and a bed 33 supported thereabove by means of a plurality of uprights 34. Preferably, the bed 33 is of substantially rectangular construction, comprising side and end members 36 and 37, respectively, defining a rectangular space 38. This space 38 is divided by a transversely extending beam 39 rigid with the side members 36, into a front portion 41 and an after portion 42.

The frame 31 is arranged with its front end member 37 parallel with and closely adjacent a suitable conveyor 43, preferably of the traveling belt type, whereby articles 44, such as substantially cubical or rectangular blocks of ice, may be conducted from any suitable source of supply to the wrapping machine and placed in position before the entrance to the wrapping machine, so that when the wrapping machine starts to operate a block 44 may be withdrawn from the belt 46 of the conveyor 43 into the wrapping machine.

*Paper supply mechanism*

A roll 51, preferably of a heavy kraft paper or other suitable wrapping material, is carried by a rod 52 which is hung in suitable, spaced brackets 53 extending from the frame 31. The end 54 of the paper of the roll 51 unrolls therefrom and extends laterally into the wrapping machine over a plate 56 which is carried by the frame 31 between two uprights 34, and which registers with the space 41 at the forward end of the frame. Above the plate 56 a roller 57 is journaled, and this roller presses the paper against the plate 56 sufficiently tightly to prevent the end 54 from being drawn backwards out of the machine. This leaves the end available to be drawn across the supporting platform 58 by mechanism 59 which is about to be described. Preferably, a loop 60 of the paper is formed between the roll 51 and the plate 56, and a cylindrical weight 61 which corresponds in length to the width of the paper, lies within the loop 60 so that when the end 54 is drawn across the platform 58 it will not be necessary to unroll the paper from the roll 51 at the speed at which the end 54 is drawn into the machine. Instead, the necessary length of paper is provided by shortening the loop 60, after which the weight 61 will cause the roll 51 to unroll slowly to replenish the supply of paper which previously has been withdrawn from the loop 60.

An extension 63 of the frame 31 is provided upon that side thereof which is opposite the roll 51 of paper, to accommodate the paper-positioning means 59 while it is inoperative. This paper-positioning means 59 comprises a pair of parallel rods 64, each of which is pivotally mounted at its lower end by means of a bearing 66 carried by one of the sills 67 of the frame extension 63. Parallel with each of the pivoted rods 64 and lying in the plane of movement thereof, is another rod 68, and the rods 64 and 68 of each pair are interconnected by means of upper and lower parallel links 69 and 71, each of which is pivoted to both associated rods 64 and 68. Each lower link 71 is extended beyond its pivotal connection to the associated rod 64, and carries a rod 72 which interconnects it to the link 71 associated with the other pair of rods 64 and 68. This rod 72 is connected to the rod 73 of a fluid motor 74. This motor comprises a cylinder 76 which is pivoted at its lower end by means of a bracket 77 to a foot plate 78 rigid with the frame extension 63 at a point materially lower than the links 71. Within the cylinder 76 a piston 79 is reciprocable, and the rod 73 is connected to the piston 79 so that when fluid is supplied to the cylinder 76, urging the piston 79 to move within the cylinder, the rod 73 will be expelled from the cylinder or drawn thereinto, depending upon whether the fluid is supplied to the lower or upper end of the cylinder 76, respectively. Fluid is adapted to be supplied to the lower and upper ends of the cylinder 76 by flexible tubes 81 and 82, respectively, which lead to opposite ends of the first valve chamber 83 of a bank 84 of such chambers, which constitutes a portion of the fluid supply mechanism 85 to be described hereinafter. When fluid under pressure is supplied through the conduit 81 to the lower end of the cylinder 76, the rod 73 is projected from the cylinder, carrying with it the rod 72, the ends of which are guided in arcuate slots 86 in transversely extending beams 87 which are rigid with the frame 31 and extension 63. This motion of the rod 72 swings both pairs of rods 64 and 68 about the axis of their alined bearings 66 laterally toward the wrapping machine, carrying with them the upper link 69 of each pair of rods 64 and 68 also, in translatory motion, i. e., each link 69 is maintained substantially horizontally and in horizontal alinement with the other link 71. The inner end of each upper link 69 is extended for a considerable distance past the associated rod 64, so that when the rods 64 and 68 are swung to their inner extreme of movement, each extension 88 extends completely across the space 41 at the forward end of the machine, and positions a jaw 89 which is provided upon the inner end of each extension 88 immediately above the end 54 of paper which projects for a slight distance past the inner edge of the platform 56.

The operation of the paper-gripping mechanism can best be understood by reference to Fig. 17. The extension 88 of each upper link 69 carries a boss 91 upon which a movable jaw 92 is provided. A push rod 93 is pivoted at one end to this movable jaw 92 and at the other end to an arm 94 of a bell crank 96 which is pivoted as by a bolt 97 to the associated extension 88 adjacent the rod 69. The other leg 98 of the bell crank 96 is adapted to be engaged by a spring-urged detent 99 carried by the hub 101 at the upper end of the associated rod 64, the parts being so proportioned and arranged that this engagement between the detent 99 and the arm 98 occurs while the paper-gripping mechanism 59 is swinging inwards. This engagement causes the bell crank 96 to rotate in a clockwise direction, as viewed upon Fig. 17, pulling the rod 93 toward the right, thereby causing the movable jaw 92 to swing downwards away from the upper fixed jaw 89, with the result that just prior to completion of the inward movement of the paper-positioning mechanism 59, the jaws 89 and 92 will be sufficiently separated to receive the end 54 of paper therebetween. The detent 99 is of such length that as the inward movement of the mechanism 59 is completed it slips past the end of the arm 98, permitting the bell crank 96 to be returned to initial position by means of a coil spring 102 which is provided for that purpose, whereupon the jaw 92 is swung upwards to press the paper between itself and the upper jaw 89. Hence, when the pressure within the conduit 81 is relieved and fluid under pressure is supplied to the other conduit 82 to draw the paper-positioning mechanism 59 back to initial position, the end 54 of paper which is engaged between the jaws 89 and 92 will be drawn across the space 41 just above the platform 58. As this retractile movement of the mechanism 59 is completed, a lever 103 which is pivoted on the rod 104 whereby the upper links 69 are pivoted to their respective rods 68, engages a stop 106, causing the lever 103 to swing in a clockwise direction, as viewed upon Fig. 17. The upper end 107 of the lever 103 is pivoted to a link 108, which also is connected to the arm 94 of the bell crank 96, so that this movement of the lever 103 causes the bell crank 96 to be swung back in a clockwise direction to initial position, thereby drawing the jaw 92 downwards away from the jaw 89 and releasing the end 54 of the paper. In this manner, a sheet 109 of paper of predetermined length is positioned upon the platform 58 in readiness to receive one of the blocks 44 of ice to be wrapped.

*Paper cutting mechanism*

As soon as the paper-positioning mechanism 59 completes its operation, the cutting mechanism 111 starts to operate. This mechanism 111 is illustrated upon Figs. 2, 4, and 18, and comprises a carriage 112 slidably mounted upon a track 113 which extends longitudinally of the machine immediately above the plate 56. Mounted upon the carriage 112 is a circular knife 114 which is journaled for rotation upon a pin 116 which is rigid with the carriage 112. The carriage 112 is adapted to be reciprocated by a second fluid motor 117 which is similar to the motor 74 of the paper-positioning mechanism 59 hereinabove described. The piston rod 118 of the motor 117 extends horizontally and is connected to the carriage 112, so that when fluid is supplied to the after end of the cylinder 119 by means of a conduit 121, the carriage 112 and knife 114 will be advanced transversely with respect to the sheet of paper 109, which previously has been drawn across the platform 58; and when the pressure within the conduit 121 is relieved and fluid under pressure is supplied to the conduit 122, which communicates with the forward end of the cylinder 119, the carriage 112 and knife 114 will be retracted. The conduits 121 and 122 communicate with opposite ends of the second valve chamber 123 of the bank 84.

Cooperative with the knife 114 is a cutter bar 126 having a groove 127 in its upper surface, adapted to receive the cutting edge of the knife 114 during reciprocation thereof to hold the paper against the knife so as to insure severance of the paper as the knife is drawn thereacross. However, instead of being rigidly mounted, the bar 126 is adapted to be swung downwards out of the way while the cutting mechanism 111 is not operative, so as to permit the jaws 89 and 92 of the positioning mechanism 59 to become engaged upon the edge 54 of the paper. The bar 126 is pivotally mounted upon the upper ends of a pair of parallel levers 128, each of which is pivoted as at 129 upon a longitudinally extending member 131 of the frame 31. The lower ends of the levers 128 are joined by a link 132 which is parallel to the bar 126. Another fluid motor 133 has its piston rod 134 pivoted to the link 132, and is adapted to swing the link 132 toward the left, as viewed upon Fig. 18, when fluid under pressure is provided to the after end of the cylinder 136 by means of a conduit 137. This swings the cutter bar 126 to the right and upwards into engagement with the under surface of the paper which previously has been drawn across the platform 58, and in position to receive the cutting edge of the knife 114 during reciprocation thereof. Upon completion of the cutting operation, the pressure within the conduit 137 is relieved and fluid under pressure is supplied to the other end of the cylinder 136 by way of the conduit 138 to retract the cutter bar 126. The conduits 137 and 138 lead to the third valve chamber 139 of the bank 84.

Article-positioning mechanism

The article-positioning mechanism is indicated in its entirety at 141, and comprises a carriage 142 which is slidably mounted for reciprocation longitudinally of the wrapping machine. For this purpose a pair of spaced, transversely extending bars 143 rigid with the under side of the carriage 142 are slidably mounted within longitudinally extending tracks 144 upon opposite sides of the space 41 and at an elevation above that of the platform 58. An arm 148 is pivotally mounted upon the carriage 142 by means of a suitable pivot pin 149, and carries at its outer end a cage 151 having a plurality of depending and preferably resilient fingers 152 which cooperate to define a rectangular space substantially equal to the horizontal cross sectional configuration of the blocks 44 to be wrapped. The other end 153 of the arm 148 inclines upwards from the pivot pin 149, and is pivotally connected to the piston rod 154 of another fluid motor 156. The conduits 157 and 158 which communicate with the cylinder 159 of the motor 156, lead to the opposite ends of the fourth valve chamber 161 of the bank 84. When fluid under pressure is supplied to the after end of the cylinder 159 through the conduit 157, the carriage 142 is slid forwards, but with the arm 148 inclining upwards and forwards therefrom in substantially the position illustrated upon Fig. 3, until the carriage 142 engages a stop 162 rigid with the tracks 144. Here the forward motion of the carriage 142 ceases, whereupon the continued advance of the piston rod 154 causes rotary motion of the end 153 of the arm 148 about the pivot pin 149, swinging the cage 151 which is carried by the arm 148, downwards against the action of a coil spring 163 which is under tension between the cage 151 and an upright 164 on the carriage 142. The parts are so proportioned that this downward motion of the cage 151 occurs when the cage is positioned over a block 44 upon the conveyor 43, so that the fingers 152 extend downwards past the upper edges of the block 44, thereby establishing the necessary engagement between the arm 148 and block 44 to cause the block 44 to be dragged into the wrapping machine upon retraction of the mechanism 141.

In order to prevent the cage 151 from striking the block 44 with sufficient force to cause injury thereto, I have provided a pair of links 166 and 167 which are pivotally connected to each other, the link 166 being pivoted to the arm 148 and the link 167 being pivoted to the upright 164. These links are so arranged that they move into alinement with each other, and thereby prevent further lowering of the cage 151 after the fingers 152 are moved downwards past the upper edges of the block 44, but before the remainder of the cage 151 can come into engagement with the upper surface of the block.

A detent 168 is pivotally mounted upon the upright 164 and is urged by a spring 169 to turn in that direction which will position its lower end over an abutment 171 on the arm 148 when the arm is in its lower extreme of movement. Hence, as soon as the arm 148 has been swung to dispose the cage 151 in block-engaging position, the detent 168 will engage the abutment 171 and prevent the arm 148 from rising during retractile movement of the piston rod 154, which is produced by relieving the pressure within the conduit 157 and supplying fluid under pressure to the conduit 158. However, when the carriage 142 arrives at its inner extreme of movement, the upper end of the detent 168 engages an abutment 172 which is rigid with the frame 31, and swings the detent to releasing position, whereupon the spring 163 raises the arm 148 and cage 151 out of engagement with the block.

Wrapping mechanism

The platform 58 provides the rigid central portion of the wrapping mechanism, which is indicated in its entirety at 176. This platform 58 is in the form of a flat plate which substantially corresponds in shape and size to the bottom of each of the blocks 44 to be wrapped. This platform 58 is rigidly mounted by means of suitable supporting members 177 which form a portion of the frame 31. Front and rear side plates 178 and 179, respectively, are pivoted to the corresponding edges of the platform 58. A forward top plate 181 is hinged to the forward edge of the front side plate 178, i. e., to that edge of the plate 178 which is uppermost when the plate 178 is swung to vertical position, and a rear top plate 182 is hinged to the after edge of the rear side plate 179, i. e., that edge of the plate 179 which becomes its upper edge when the plate 179 is swung to vertical position. A lower end plate 183 is hinged to each of the side edges of the platform 58, and preferably the outermost edges of the plates 183, i. e., those edges which become their uppermost edges when the plates are swung to vertical position, are shorter than the edges of the plates 183 which are proximal to the platform 58. Preferably, the front and rear side plates 178 and 179 are wider than the platform 58, as best illustrated upon Figs. 1 and 5. The width of each of the front and rear side plates 178 and 179 is substantially equal to the combined width of the platform 58 and the bottom end plates 183. A pair of intermediate end plates 184 are hinged to the front side plate 178 for movement about an axis in alinement with the side edges of the platform 58, i. e., the distance between the axes of the plates 184 is equal to the width of the platform 58. Similar intermediate end plates 186 are similarly hinged to the after end plate 179.

Normally the platform 58, the front and rear side plates 178 and 179, and the front and rear top plates 181 and 182, lie in a common plane, whereas the front and rear intermediate end plates 184 and 186 lie upon the upper surfaces of the front and rear side plates 178 and 179, respectively, as best shown upon Fig. 1.

The first step in the wrapping operation starts immediately a block to be wrapped has been positioned upon a sheet of paper 109 which rests upon the platform 58, as illustrated upon Fig. 19. This first step in the wrapping operation is to raise the forward end plate 178 to vertical position, folding the forward end 187 of the paper 109 into engagement with that end of the block 44 which is toward the front end of the machine, as illustrated upon Fig. 20. This movement of the forward end plate 178 is attained through the expedient of another fluid motor 191, the cylinder 192 of which is connected by lower and upper conduits 193 and 194, respectively, to the opposite ends of the fifth valve chamber 196 of the bank 84. The piston rod 197 of the motor 191 is pivotally connected to a crosshead 198, which preferably is in the form of a plate having a longitudinally extending slot 199 therein, through which a screw 201 extends to be threaded into the inner side of the forward side plate 178, thereby slidably engaging the crosshead 198 upon the under surface of the plate 178. Inasmuch as the rod 197 extends upwards to the crosshead 198, energization of the motor 191 to expel the rod 197 from the cylinder 192 swings the plate 178 upwards about the axis of its pivotal connection to the platform 58 and into vertical position, carrying with it the front top plate 181 and the two intermediate end plates 184, so that they also are positioned vertically. Continued swinging of the front plate 178 past vertical position is prevented by its engagement with the block 44, whereupon continued upward motion of the piston rod 197 causes the crosshead 198 to slide upwards with respect to the plate 178 and against the action of a coil spring 202 which is under tension between a screw 203 carried by the crosshead 198, and a block 204 rigid with the plate 178 and extending through the slot 199 (see Fig. 7). This block 204 also serves as a guide which cooperates with the screw 201 for the crosshead 198.

The sliding movement of the crosshead 198 with respect to the front side plate 178 causes a pair of pins 206 which are carried by the crosshead 198 to come into engagement with the under surface of alined, hook-shaped fingers 207 which extend from the under surface of the front top plate 181 and incline therefrom past the axis of the pivotal connection 205 of the plate 181 to the plate 178. Inasmuch as the engagement between the pins 206 and the fingers 207 takes place below the plane of the plates 178 and 181, continued sliding motion of the crosshead 198 with respect to the plate 178 causes the top plate 181 to swing downwards against the action of coil springs 210, folding the end 187 of the paper 109 down against the upper surface of the block 44, as illustrated upon Fig. 22. Instead of being rigid with the plate 181, however, the fingers 207 are carried by a plate 208 which is pivoted to the plate 181 by a pin 209. The plate 208 is normally held in contact with the under surface of the plate 181 by a spring 211 which is under compression between the plate 208 and a bracket 212 rigid with the under surface of the plate 181. The purpose of this construction is to permit the fingers 207 to swing upwards away from the plate 181, if the crosshead 198 continues its sliding movement with respect to the plate 178 after the downward swinging movement of the plate 181 is stopped by its engagement with the upper surface of the block 44. In this manner, I have compensated for slight variation in the height of the blocks 44 to be wrapped, and have made it possible for the machine to operate satisfactorily, even though a material difference in this dimension of the block occurs.

The crosshead 198 is also provided with a pair of inclined cam surfaces 216 on its lateral edges, which are adapted to engage laterally slidable plates 217 which are mounted upon the under surface of the forward side plate 178, and thus force the plates 217 outwards, causing their outer ends to engage abutments 218 on the under surfaces of the intermediate end plates 184 and swing the plates 184 about the axes of their pivotal connections to the front side plate 178, thereby folding portions 258 of the end 187 of the paper 109 against the ends of the block 44, as illustrated upon Fig. 24. This movement of the intermediate end plates 184 occurs after the front side plate 178 has been swung to vertical position, so that the plates 184 swing about vertical axes. Moreover, this motion of each of the plates 184 is resisted by a spring 219 (see Fig. 8) under tension between the associated abutment 218 and a bracket 221 which is rigid with and extends downwards from the under surface of the associated portion of the plate 178, it being understood that the projection 218 extends through a suitable aperture 222 formed in the plate 178 for that purpose. These springs 219 urge the end plates 184 into retracted position, and slide the pusher plates 217 back into starting position upon withdrawal of the crosshead 198.

The operating mechanism for the after side plate 179 is similar to that associated with the forward end plate 178 hereinabove described. It includes a crosshead 223 provided with laterally extending pins 224 adapted to engage hook-shaped fingers 226 which extend downwards and inwards from the after top plate 182. These fingers are similarly carried by a pivoted plate 227, which permits continued sliding movement of the crosshead 223 after the side plate 179 has been swung to vertical position. The crosshead 223 is also provided with cam surfaces 228 adapted to engage pusher plates 229 and slide them outwards into engagement with abutments 231 which extend downwards through apertures 232 in the after side plate 179, these abutments 231 being carried by the forward intermediate end plates 186, so that they are swung about vertical axes to fold portions 259 of the forward end 233 of the paper 109 against the ends of the block 44, as illustrated upon Fig. 24. The crosshead 223 is connected to the piston rod 234 of another fluid motor 236, the cylinder 237 of which has its lower and upper ends, respectively, connected by conduits 238 and 239 to the sixth valve chamber 241 of the bank 84.

As thus far described, the construction and operation of the after side plate 179 and its associated paper-folding plates 182 and 186, are substantially the same as the construction and operation of the forward side plate 178 and its associated paper-folding plates 181 and 184. As stated hereinabove, the forward top plate 182 is swung downwards to fold the paper against the upper surface of the block 44 after the after side plate 179 has been swung upwards to vertical position. This motion of the forward top plate 182 is effected by continued sliding movement of the crosshead 223 until the pins 224 engage the fingers 226, and inasmuch as the point of engagement lies beyond the axis of pivotal mounting of the plate 182 to the plate 179 from those faces thereof which are proximal to the block 44, the plate 182 is swung downwards from vertical position to horizontal position, as will readily be understood. Upon completion of the swinging movement of the after top plate 182 to horizontal position, continued upward sliding movement of the crosshead 223 will cause the fingers 226 and the plate 227 by which they are carried to be swung upward about the axis of their pivotal connection 242 to the after top plate 182. Hence, this action of the fingers 226 and their supporting plate 227 is similar to that of the fingers 207 and their supporting plate 208 of the forward top plate 181, thereby compensating for variations in the height of the blocks 44 being wrapped.

However, further advantage is taken of this swinging movement of the plate 227. It is provided with a wedge-shaped projection or cam 246, which is best shown upon Figs. 7 and 11. The point or apex 247 of the cam 246 points downwards, and is disposed between two rollers 248, each of which is carried by a push rod 249. These push rods extend transversely outwards from the cam 246, and are slidably mounted upon the under surface of the after top plate 182 by means of alined brackets 251. Each of these push rods 249 is provided with a shoulder 252 upon its outer end, which engages an abutment pin 253 which is carried by an upper end plate 254. One of these upper end plates 254 is pivoted adjacent each end of the after top plate 182, being hinged thereto as indicated at 256, and the abutment pin 253 of each of the plates 254 is spaced from the axis of the associated hinged connection 256, so that when the push rods 249 are slid outwards upon their supporting plate 182, the upper end plates 254 will be swung inwards toward the block. As stated hereinabove, the cam wedge 246 is not swung outwards, i. e., upwards away from the plate 182, until after the plate 182 has been swung from vertical position down to horizontal position, folding the after end 233 of the paper 109 against the upper surface of the block 44. It should be explained that this motion of the after end plate 182 is resisted by coil springs 255. Hence, the inward swinging movement of the plates 254 does not occur until after they are swung to horizontal position by the plate 182. Accordingly, this motion of the plates 254 is from horizontal position to vertical position, wherein they fold the upper end flaps 257 downwards to vertical position against the side end flaps 258 and 259, which previously have been folded against the ends of the blocks 44 by the intermediate end plates 184 and 186, respectively. Hence, upon completion of the operation of the upper end plates 254, the paper 109 is wrapped about the block 44 substantially as illustrated upon Fig. 25.

This leaves only the bottom end flaps 260 to be folded upwards against the block and against the side end flaps 258 and 259, to complete the wrapping operation. This is accomplished by means of the upward swinging movement of the lower end plates 183, one of which is hinged to each lateral edge of the platform 58. Each of these lower end plates 183 is adapted to be swung upwards by means of an individual fluid motor 261, 262 similar to the fluid motors previously described and pivotally connected to the under surface of the plates 183. Although it would be entirely practical to connect the cylinders 263 and 264 of the motors 261 and 262, respectively, to a single control valve, I prefer that the conduits 266 and 267 leading from the lower and upper ends of the cylinder 263 respectively be connected to the seventh valve chamber 268 whereas the conduits 269 and 271 be connected to opposite ends of the eighth valve chamber 272. These fluid motors 261 and 262, as well as all the other fluid motors hereinabove described, have the after ends of their respective cylinders 263 and 264 pivoted to the frame 31, so that no binding occurs as a result of the arcuate path of the outer ends of their respective piston rods as they swing the plates upwards and inwards.

It is impractical to exert the necessary care in manufacture of the blocks 44 of ice to be wrapped to produce them all of precisely the same proportions. Accordingly, in actual practice, a slight variation occurs in the size of these blocks, and for this reason I have provided flexible, hinged connections between certain of the paper-folding plates, whereby the wrapping machine is permitted to operate efficiently even though a block 44 slightly larger than others is passed into the machine for wrapping. The means for compensating for discrepancies in the height of the blocks has been described hereinabove, this being the hinged connection of the plates 208 and 227. However, means are also provided in the pivotal connections of the plates 178, 179, and the two plates 183 to the platform 58. Each of these plates is mounted by means of a flexible, hinged connection, but inasmuch as all of these four hinged connections are substantially the same, it will suffice for the purpose of the present disclosure to describe but one of them, for example the hinged connection by which each of the lower end plates 183 is connected to the associated side of the platform. Each of these lower end plates 183 is provided with a substantially semi-circular hub 276 which extends half way around a pin 277 rigid with the platform 58. This pin 277 lies substantially in alinement with the associated edge of the platform 58, inasmuch as it extends across a notch 278 formed in that edge. Preferably, the pin 277, instead of being of circular cross section, is semi-circular, as best shown upon Fig. 9, so that the axis about which the plate 183 swings lies in the plane of the upper surface of the plate 58. However, should it happen that the plate 183 is swung upwards toward an end of a block 44 which is slightly wider than the platform 58, the plate 183 is permitted to move outwards away from the platform, because of the fact that the hub 276 is open at its upper or inner side. This flexibility of the hinged connection is best illustrated upon Fig. 10, which shows one of the lower end plates 183 swung upwards as hereinabove described, folding the bottom flap 260 against the end of the block 44, and showing the hub 276 moved outwards slightly from its pintle pin 277.

This separation of the hub 276 from the pin 277 is resisted by a pair of coil springs 279, each of which is under tension between the plate 183 and the platform 58. Moreover, each spring 279 is stretched across the arcuate surface of a semicircular guard 281 which is arranged with the axis of its arcuate surface lying in the axis of the pin 277. The action of the springs 279 serves to insure seating of the pin 277 within the hub 276 as the plate 183 swings back from vertical position toward the horizontal. As stated hereinabove, the hinged connection of each of the forward and after side plates 178 and 179 is similar to those whereby the end plates 183 are mounted, with the result that discrepancies in both the length and width of the blocks 44 being wrapped are compensated for. Inasmuch as the hinged connections between these several plates and the platform 58 become disconnected when the plates are swung upwards to fold the paper about an oversize block 44, I have found it advisable to provide means for preventing the forward and after side plates 178 and 179 from sliding upwards with respect to the block after they have been swung to vertical position, it being remembered that the crossheads 198 and 223 must continue upward sliding movement after their respective side plates 178 and 179 have been swung to vertical position. Accordingly, I have provided links 282 pivoted at their upper ends to each of the plates 178 and 179, each link being connected at its lower end to the uprights 177 whereupon the platform 58 is supported. Their connection to the uprights 177 is by means of a pin 283 associated with each of the links 282, and engaged therewith within a slot 284 which permits the necessary amount of axial and pivotal movement of the link, but prevents continued axial movement after the associated side plate 178, 179 has been swung to vertical position.

*Adhesive-applying mechanism*

Whereas it would be entirely practical to employ paper which is supplied in cut sheets, instead of in a continuous roll, which sheets are provided with suitable adhesive which requires merely being moistened to insure its establishing suitable bond between different portions of the wrapped sheet, I prefer to employ paper or other suitable wrapping material which is provided in a roll 51, as hereinabove described, and to provide means for applying a suitable adhesive such as glue to predetermined areas of the sheet, preferably during the folding process. Preferably three reservoirs, 286, 287, and 288 for glue or other suitable adhesive material, are provided and in each a roller 289 is journaled. The shaft 291 of each of the rollers 289 extends to the outside of the associated reservoir, and carries a pulley 293 which is connected by a belt 292 to another pulley 294, all of these pulleys 294 being mounted upon a drive shaft 296 journaled in suitable location below the bed 33 and adapted to be rotated by means to be described hereinbelow. Hence, all the supply rollers 289 are adapted to be rotated, and inasmuch as each is partially immersed within liquid glue 297 within the associated reservoir this rotation of the rollers 289 will carry a film of glue upwards to moisten a movable roller which normally is pressed thereagainst. However, in order to prevent the delivery of an excess quantity of glue to these movable rollers, each of the reservoirs 286 is provided with a scraper 298 which scrapes off all but a film of predetermined thickness of glue on that side of the supply roller 289 which is moving upwards.

The movable roller 301 which is associated with the reservoir 286 is carried by the forward top plate 181, whereas the movable rollers 302 and 303 which are associated with the reservoirs 287 and 288, respectively, are carried by the upper end plates 254. These movable rollers 301, 302, and 303 are all mounted in substantially the same manner. Hence, it will suffice to describe herein the mounting of only the roller 301. A pair of brackets 304 extends rigidly downwards from the under surface of the forward top plate 181, and have a shaft 306 extending between their lower ends. Levers 307 are mounted for rocking movement upon this shaft 306, and the roller 301 is journaled between the outer ends of the two levers 307, as best shown upon Fig. 5. Between the other end of one or each of the levers 307 and the under surface of the plate 181, a coil spring 308 is under tension, urging the levers 307 to swing in that direction which will move the roller 301 away from the plane of the plate 181, pressing the roller 301 against the associated supply roller 289 when the paper-folding mechanism is in receiving position.

Inasmuch as the wrapping machine has been designed primarily for use in wrapping blocks of ice, necessitating its use within a refrigerated room, I have found it advisable to provide an electrical resistance element 309 for each of the reservoirs 286, 287, and 288, whereby sufficient heat may be generated and applied to the glue 297 within the reservoir to assure its being maintained at a suitable state of fluidity. Current is supplied to the resistance elements 309 by way of electrical conductors 311.

The rollers 301, 302, and 303 are mounted upon their respective plates 181 and 254 in such position that they extend parallel to the respective axes about which these plates swing. Moreover, the rollers 301, 302, and 303 are spaced outwards from the outer edges of their respective supporting plates, as clearly shown upon Fig. 5. As indicated upon Figs. 22 and 23, the operation of the forward top plate in swinging downward toward the upper surface of the blocks precedes the corresponding operation of the after top plate. This positions the roller 301 under the after edge 233 of the sheet 109 of paper as the edge 233 is being swung downwards by the after top plate 182, causing the edge 233 of paper to brush against the glue-moistened roller 301, which thereby applies a sufficient quantity of glue to the under surface of the edge 233 to establish suitable bond between the edge 233 and the edge 187 after the after end of the paper has been folded downwards onto the block with the extreme end 233 thereof overlapping the edge 187. The operation of the rollers 302 and 303 is similar. As indicated upon Figs. 25 and 26, the upper end flaps 257 are swung downwards by the plates 254, and against the ends of the block before the lower end flaps 260 are swung upwards by the plates 183. Hence, the rollers 302 and 303 will be in position to be engaged by the inner surfaces of the lower end flaps 260 as they swing toward the end of the block thereby becoming moistened with glue to establish suitable bond between the flaps 260 and the flaps 257 after the flaps 260 have been pressed thereupon and in overlapping relationship therewith, as indicated upon Fig. 26.

*Discharge mechanism*

The delivery mechanism is indicated in its entirety at 316, and is adapted to remove the wrapped blocks of ice from the platform 58. This delivery mechanism 316 comprises a carriage 317 slidably mounted for reciprocation longitudinally of the wrapping machine upon tracks 318 parallel to and below the tracks 144 of the positioning mechanism 141. The carriage 317 is adapted to be slid upon the tracks 318 by means of another fluid motor 319, the piston rod 321 of which, however, instead of being connected directly to the carriage, is connected to a wedge 322 (see Figs. 14 and 15) which is slidably mounted upon the upper surface of the carriage 317. A pair of spaced brackets 323 incline downwards and forwards from the carriage 317, and journaled therebetween is a rod 324 which carries a detent 326 which is free to swing about the axis of the rod 324. This permits the delivery mechanism 316 to be advanced across the wrapped block 44, with the detent 326 dragging across the upper surface thereof. As soon as the detent 326 passes the block it will drop, so as to position an angular foot 327 which is carried at its lower end, in engagement with the upper corner of the block, as illustrated upon Fig. 15. Accordingly, upon retractile movement of the delivery mechanism 316, the wrapped block 44 will be dragged back with the mechanism 316, and off the platform 58 and across the plates 179 and 182 to a conveyor mechanism 325 of suitable design, the inner end of which is positioned closely adjacent the outer edge of the plate 182 when the paper-folding plates are lying in a horizontal plane.

However, means are provided for gripping the block by its ends also. This gripping means is in the form of a presser foot 331 adapted to engage each end of the block, each of these presser feet being carried at the lower end of a lever 332 which is pivoted to and hangs downwards from the carriage 317. The upper ends of the levers 332 are disposed above their pivotal connections to the carriage, and are adapted to be engaged by the wedge 322 when the wedge slides forwards upon the carriage 317. This motion of the wedge 322 with respect to the carriage 317 is resisted by preferably a pair of coil springs 333 under tension between projections 334 which are rigid with the wedge 322 and extensions 336 from the after edge of the carriage 317. Accordingly, forward motion of the wedge 322 with respect to the carriage 317 will not occur until the carriage 317 has been slid to the forward end of the tracks 318 and into engagement with a stop 337 which prevents continued forward motion of the carriage, whereupon the continued advance of the piston rod 321 will cause the wedge 322 to be advanced across the carriage 317, increasing the tension of the spring 333. A forward extension 338 of the wedge 322 is provided with ratchet teeth 339 adapted to be engaged by a pawl 341 which is carried by the carriage 317, thereby preventing retractile motion of the wedge 322 with respect to the carriage 317 during the retractile motion of the carriage and until a lever 342 which is connected to the pawl 341 comes into engagement with an abutment 343 rigid with any suitable portion of the frame 31. As stated hereinabove, the wedge 322 is adapted to engage the upper ends of the levers 332 when the wedge slides forwards upon the carriage 317, i. e., after the carriage 317 has reached its forward extreme of motion which positions the carriage over the wrapped block 44. The inclined surfaces 344 at the lateral edges of the wedge 322 will then swing the upper ends of the levers 332 outwards, swinging the presser feet 331 inwards into engagement with the ends of the wrapped block, so that they press thereagainst and continue to do so on account of the engagement of the pawl 341 during retraction of the delivery mechanism 316. Preferably, the levers 332 are of such length that the presser feet 331 engage the outer surfaces of the lower end flaps 260, and I prefer that each of the presser feet 331 be provided with an electrical resistance element 346 adapted to be energized by conductors 347 so as to apply heat to the presser feet 331 to expedite the drying or hardening process of the glue which holds the flaps 260 against the flaps 257. The conduits 348 and 349 which communicate with the opposite ends of the cylinder of the motor 319 communicate with the opposite ends of the ninth and last valve mechanism 351 of the bank 84.

Inasmuch as the glue-applying roller 301 which is carried by the forward top plate 181, is spaced outwards from the outer edge of that plate, it is necessary to so construct the machine that the outer edge of the plate 181 is disposed at a material distance from the conveyor 43. Accordingly, I have provided a pivotally mounted plate 352, which normally is held up in inclined position, as indicated in dashed lines upon Fig. 7, by a spring 353, but which is adapted to be swung downwards to horizontal position to bridge the gap between the conveyor 43 and the plate 181, so as to permit the blocks of ice to be dragged thereacross to the plates 181 and 178 onto the platform 58.

*Hydraulic fluid supply and control mechanism*

Figure 13:
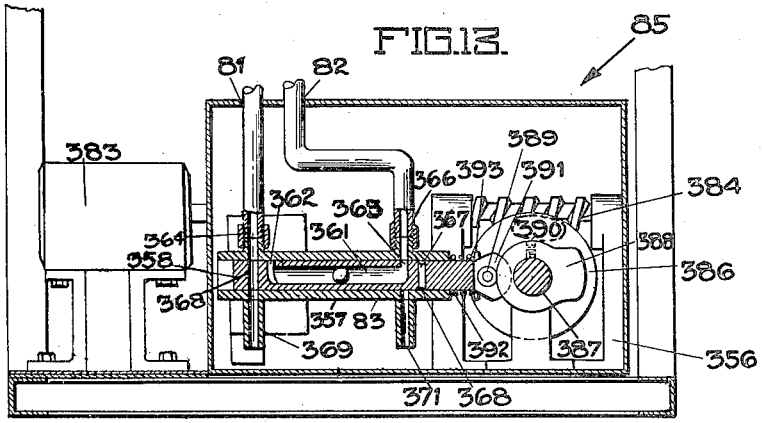
Fig. 13 is a transverse vertical sectional view taken upon the line 13—13 of Fig. 12, with the direction of view as indicated.

The means 85 for supplying hydraulic fluid under pressure to each of the several fluid motors hereinabove described, is illustrated upon Figs. 12 and 13. It comprises a reservoir 356 within which the bank 84 of nine valve chambers is disposed. Fig. 13 illustrates the construction of one of the valve chambers, say the valve chamber 83, whereby operation of the fluid motor of the paper-positioning mechanism 59 is controlled, and it should be understood that all the valve chambers of the entire bank 84 are of substantially the same construction. The valve chamber 83 comprises a substantially tubular housing 357 having a valve 358 reciprocable thereinside. Hydraulic fluid, preferably oil, under pressure is supplied by means of a pump 359 to all of the housings 357 intermediate their ends, so that this pressure is imposed at all times upon a passageway 361 which extends longitudinally of each valve 358 but which terminates short of the ends thereof in lateral passages 362 and 363. The spacing between these passages 362 and 363 is less than the spacing between the ports 364 and 366 in the housing 357, it being understood that it is to these ports that the conduits leading from the associated fluid motor are connected. In the present instance these conduits are the conduits 81 and 82 leading from the cylinder 76 of the paper-positioning mechanism 59. Hence, pressure can be supplied optionally to either of the conduits 81 or 82, depending upon the position of the valve 358. The pressure within the conduit 81 or 82 which is not connected to the passage 361, is relieved by means of a lateral passage 367 or 368, respectively, through the valve 358, it being understood that the housing 357 is provided with ports 369 and 371 directly opposite each of the ports 364 and 366, respectively. These ports 369 and 371 open to the reservoir 356, so that the oil which is released during retractile movement of the associated piston is simply discharged back into the reservoir. The inlet 372 of the pump 359 is also open into the reservoirs 356, so that all the oil which is necessary for the operation of the several fluid motors is withdrawn from the reservoir 356 by the pump, and is subsequently delivered back thereinto upon retractile motion of that motor.

The shaft 376 of the pump 359 is adapted to be rotated by bevel gears 377 and 378, the latter of which is carried by a drive shaft 379 within the reservoir 356 and immersed within the oil therein. One end 381 of the shaft 379 extends through a suitable stuffing box 382 in a wall of the reservoir 356 to be connected to a motor 383. Within the reservoir 356 the shaft 379 carries a worm 384 enmeshed with a worm wheel 386 carried by a cam shaft 387. This shaft 387 carries a cam 388 for each of the valves 358, so that the necessary synchronization of the various fluid motors may easily be attained by adjustment of the cams 388 upon the shaft 387. Each cam 388 is retained in adjusted position by means of a set screw 389 or its equivalent. Each of the valves 358 extends from its associated housing 357 and carries a cam follower 389 which rides over the surface of the associated cam 388 as that cam rotates. Preferably, each of the valves 358 is provided with flange extensions 391 upon opposite sides of the associated follower 389, these flanges 391 embracing the sides of the associated cam 388, so as to prevent rotation of the associated valve 358 about its longitudinal axis, thereby restricting the motion of the valve to movement in an axial direction. A coil spring 392 under compression between the end of the housing 357 and a shoulder 393 on the valve 358 urges the follower 389 against its associated cam 388.

Inasmuch as all the cams 388, valve housings 357, valves 358, cam followers 386, as well as the worm 384 and worm wheel 386, the journals for the shafts 379 and 387, and the gears 378 and 377, are immersed within the oil contained within the reservoir 356, no attention whatever need be paid to lubrication of these portions of the wrapping machine.

Energization of the motor 383 is controlled by a limit switch 396 which is positioned over the conveyor 43 whereby the blocks 44 of ice to be wrapped are conducted to the wrapping machine. Moreover, the switch 396 is so positioned that it will be engaged by a block 44 and closed when that block has been carried by the conveyor into the proper position to be engaged by the positioning mechanism 141 and dragged into the machine. This insures that the block 44 to be wrapped will be not only in proper position, but will be motionless upon the conveyor 43 at the time that it is engaged by the cage 151. Moreover, this means of control makes it possible to provide more than one wrapping machine to be fed by the supply conveyor 43. Upon Fig. 1 another wrapping machine is indicated in dashed lines at 397, and the motor (not shown) of the second wrapping machine 397 is also adapted to be energized by closing of the switch 396. This avoids the necessity of providing complicated and expensive synchronizing mechanism, which otherwise would be necessary to cause a plurality of wrapping machines to operate at the same speed, as would be required if they were not all started into operation at the same instant. Under the present arrangement, no one of the wrapping machines can start until a block has come into engagement with the switch 396, and is held stationary thereby. Under the normal arrangement, blocks will be supplied to the conveyor 43 at such a rate that they are closely adjacent each other thereupon, with the result that the next block 398 will be carried into engagement with the block 399 which engages the switch 396 and held stationary thereby until the block 398 is taken off the conveyor 43 by the wrapping machine 397.

A holding switch 401 is illustrated in detail upon Fig. 16, and comprises a fixed contact 402 and a movable contact 403 carried by a pivotally mounted arm 404. The outer end of the arm 404 carries a roller 406 which rides over the surface of a cam 407 which is mounted upon the shaft 296 whereby the glue supply rollers 289 are rotated, and this shaft 296 extends through a suitable stuffing box 408 into the reservoir 356 where it is connected to the cam shaft 387 to be rotated thereby through one full turn each time the cam shaft 387 makes a complete revolution. The roller 406 is adapted to drop into a notch 409 upon completion of the cycle of operation of the wrapping machine, thereby disconnecting the contacts 402 and 403 which are connected in parallel with the contacts of the limit switch 396, and breaking its branch of the support to the motor 383. However, as soon as the motor 383 is energized by the next successive block 44 coming into contact with the limit switch 396, the cam 407 will start to turn, raising the roller 406 from the notch 409 and bringing the contact 403 into engagement with the contact 402 to maintain energization of the motor after the block 44 is removed from the limit switch 396 and until completion of the cycle of operation of the wrapping machine.

*Operation*

It is believed that the operation of the several individual parts of the wrapping machine will be adequately understood from the description of their construction and operation which have been included hereinabove. However, the following description of the machine's operation will assist in understanding the synchronization between the constituent parts of the machine during one complete cycle of operation.

After energization of the motor 383, the first cam 388 to engage its cam follower 389 and slide its valve 358 so as to supply fluid under pressure to that end of the associated cylinder which causes the associated fluid motor to operate in the forward direction, is the cam 388 of the first valve 83 of the bank 84, which, as explained hereinabove, is connected to the fluid motor 74 of the paper-advancing mechanism. Hence, the first operation is to advance the paper-positioning mechanism 59, so that the jaws 89 and 92 may engage the end of the paper from the roll 51. The cam then passes out of engagement with the follower, permitting the valve 358 to return to initial position, relieving the pressure within the advance side of the cylinder 76, and supplying fluid under pressure to the retraction side, whereupon the mechanism 59 is retracted, drawing a sheet 109 of paper of predetermined length across the platform 58. The next operation is to raise the cutter bar 126, which is attained as a result of the engagement of the next cam 388 with its associated follower 389. The high point on this cam is wide enough to maintain the cutter bar 126 elevated during operation of the severing mechanism wherein the knife 114 is projected across the paper as a result of the engagement of the next cam 388 with its cam follower. The cutting mechanism and the cutter bar are then moved back to retracted position as a result of the passing of the high points of the respective cams out of engagement with their respective cam followers.

During operation of the cutting mechanism, or immediately subsequent thereto, the positioning mechanism 141 is energized, causing the arm 148 to advance and lower, engaging the fingers 152 of the cage 151 with the block 44 which has closed the limit switch 396, whereupon the positioning mechanism 141 is retracted to position the said block on the sheet 109 of paper and immediately over the platform 58, as hereinabove described. This places the block and paper in the relative positions illustrated upon Fig. 19. During the initial movement of the block from the conveyor toward platform 58 it encounters the normally inclined plate 352 and presses this plate downwardly against the action of springs 353 into the position shown in Figures 6 and 7. By reference to Figure 1 it will be noted that the forward edge of the paper is positioned beneath the rear edge of plate 352 so that while the block passes over the plate the forward edge of the paper is effectively clamped beneath plate 352. This temporary clamping of the paper is sufficient to hold it in place while the block moves onto the paper. During the completion of the movement of the block the paper frictionally remains in place.

The fluid motors 191 and 236 are then energized, the former slightly in advance of the latter, it being remembered that these motors are operably coupled to the forward side plate 178 and the after side plate, respectively. Hence, the first step in the wrapping operation causes the forward end 187 of the paper, to be folded up against the forward end of the block 44, as illustrated upon Fig. 20, and the next step positions the after end 233 against the after end of the block, as illustrated upon Fig. 21. Continued upward motion of the crosshead 198 causes the forward top plate 181 to swing past the vertical and downwards toward horizontal position against the upper surface of the block, positioning the paper as illustrated upon Fig. 22, and as this is happening the after top plate 182 is being swung downwards toward the position illustrated upon Fig. 23. As this occurs, the extreme edge of the paper will brush across the glue-applying roller 301, moistening the under surface of the end 233, so that when it reaches the position illustrated upon Fig. 23, it will adhere to the end 187 of the paper. The continued upward sliding movement of the crosshead 223 with respect to the plate 179 upon which it is mounted, effects lifting the pivoted plate 227, driving the cam wedge 246 upwards between the rollers 248 to force the push rods 249 outwards, which, as explained hereinabove, causes the upper end plates 254 to swing downwards, carrying the flaps 257 downwards into engagement with the ends of the block, as illustrated upon Fig. 25. This disposes the glue-applying rollers 302 in position to be brushed against by the ends of the lower end flaps 260 as they are folded upwards by the subsequent operation of the lower end plates 183, thereby applying sufficient glue to the inner surfaces of the flaps 260 to cause them to adhere to the flaps 257 and thereby retain the paper which has been wrapped, about the block, as shown upon Fig. 26.

The fluid motors associated with the wrapping plates are then reversely operated, this being caused by the high points on their respective cams 388 passing out of engagement with their associated cam followers 389, as explained hereinabove. This will cause the paper-folding plates to unwrap themselves from around the wrapped block and assume their initial position, wherein they all lie substantially within the plane of the platform 58.

The next step in the operation of the machine is the delivery of the wrapped block from the platform 58 to the conveyor 325, this being effected by the delivery mechanism 316, the operation of which has been described hereinabove. Upon completion of the operation of the delivery mechanism, the notch 409 of the cam 407 will move into registry with the roller 406 of the switch 401, permitting the switch to open and break the circuit whereby the motor 383 is energized, and thus causing the entire machine to come to rest awaiting the arrival of the next block 44 at the limit switch 396, provided the next block has not already arrived there before completion of the preceding cycle of operation.

It is to be understood that the details of the invention as herein disclosed, are subject to alteration within the spirit or scope of the appended claims.

I claim:

1. In a wrapping machine, a platform adapted to receive a sheet of wrapping paper and an article to be wrapped, paper-folding plates disposed about the edges of said platform, and yieldable means pivotally connecting each of said plates to said platform urging the plates to assume positions adjacent the platform but enabling them to move outwardly therefrom.

2. In a wrapping machine, a platform adapted to receive a sheet of wrapping paper and an article to be wrapped, paper-folding plates disposed about the edges of said platform, yieldable means pivotally connecting each of said plates to said platform urging the plates to assume positions adjacent the platform but enabling them to move outwardly therefrom, means for swinging said plates upwards about the axis of said connecting means, and means limiting upward movement of said plates away from said platform upon completion of swinging movement thereof.

3. In a wrapping machine, a platform adapted to receive a sheet of wrapping paper and an article to be wrapped, paper-folding plates disposed about the edges of said platform, and yieldable means pivotally connecting each of said plates to said platform urging the plates to assume positions adjacent the platform but enabling them to move outwardly therefrom, said connecting means lying entirely below the plane of said platform when said plates are in receiving position.

4. In a wrapping machine, a platform adapted to receive a sheet of wrapping paper and an article to be wrapped, paper-folding plates disposed about the edges of said platform, yieldable means pivotally connecting each of said plates to said platform urging the plates to assume positions adjacent the platform but enabling them to move outwardly therefrom, means for swinging said plates upwards about the axis of said connecting means into perpendicularity with the plane of said platform to fold said paper against the sides of said article, and means holding said plates from sliding upwards away from said platform after folding said paper.

5. In a wrapping machine, a pair of plates adapted to press paper against adjacent sides of an article to be wrapped, said plates normally lying in a common plane, means for swinging one of said plates about an axis adjacent the proximal edge of the other plate to fold said paper about a corner of said article, and yieldable means for pivotally connecting said plates, comprising a pin rigid with one of said plates and extending with its edge parallel to said edge, a hub member rigid with the other plate and extending partially around said pin, the upper side of said hub member being open to permit the associated plate to move away from said pin when swung upwards against an article projecting beyond said axis, and spring means resisting said movement away from said pin.

6. In a wrapping machine, a pair of plates adapted to press paper against adjacent sides of an article to be wrapped, said plates normally lying in a common plane, means for swinging one of said plates about an axis adjacent the proximal edge of the other plate to fold said paper about a corner of said article, and yieldable means for pivotally connecting said plates, comprising a pin rigid with one of said plates and extending with its edge parallel to said edge, a hub member rigid with the other plate and extending partially around said pin, the upper side of said hub member being open to permit the associated plate to move away from said pin when swung upwards against an article projecting beyond said axis, an arcuate guard carried by the plate to which said hub is attached, the center of the arc described by said guard lying within the axis of said pin, and a spring under tension between said plates and stretched around the arcuate surface of said guard.

7. In a wrapping machine, a horizontal platform adapted to support a sheet of paper and an article to be wrapped, and means for folding said sheet about said article, comprising a side plate hinged at its lower edge to said platform, means for swinging said side plate to vertical position to fold said sheet against a side of said article, an end plate hinged to an end of said side plate, and a top plate hinged to the upper edge of said side plate, means operative by said swinging means subsequent to the arrival of said side plate in vertical position for swinging said end plate into perpendicularity with the side plate to fold said sheet against an end of said article and for swinging said top plate into horizontal position to fold said sheet against the top of said article.

8. In a wrapping machine, a horizontal platform adapted to support a sheet of paper and an article to be wrapped, and means for folding said sheet about said article, comprising a side plate hinged at its lower edge to said platform, a crosshead slidably mounted on said side plate for movement in a path perpendicular to the axis of its hinged connection to the platform, a rod extending upwards to and pivotally connected to said crosshead, means for raising said rod to swing said side plate upwards and to fold said sheet against a side of said article, an end plate hinged to an end edge of said side plate, a cam on said crosshead, an abutment projecting from said end plate, means slidable laterally on said side plate engageable by said cam and adapted to engage said abutment to swing said end plate into perpendicularity with said side plate upon continued movement of said crosshead after swinging said side plate to vertical position, a top plate hinged to the upper edge of said side plate, and an abutment on said top plate engageable by said crosshead upon said continued movement thereof to swing said top plate to horizontal position.

9. In an ice wrapping machine, means providing a platform, means for positioning a sheet of wrapping paper thereon, means for positioning a block of ice on the sheet, side folding plates for folding the sides of the sheet up against the sides of the block, means providing a yieldable pivotal connection between the side folding plates and the platform enabling the side folding plates to move outwardly from the sides of the platform in folding the sides of the sheet against blocks of various thicknesses, and actuating means for swinging the side folding plates upwardly against the sides of the block.

10. In an ice wrapping machine, means providing a platform, means for positioning a sheet of wrapping paper thereon, means for positioning a block of ice on the sheet, side folding plates for folding the sides of the sheet up against the sides of the block, means providing a yieldable pivotal connection between the side folding plates and the platform enabling the side folding plates to move outwardly from the sides of the platform in folding the sides of the sheet against blocks of various thicknesses, actuating means for swinging the side folding plates upwardly against the sides of the block, and top folding plates pivotally connected to the edges of the side folding plates and operable by said means for folding the sheet over the top of the block.

11. In an ice wrapping machine, means providing a platform, means for positioning a sheet of wrapping paper thereon, means for positioning a block of ice on the sheet, side folding plates for folding the sides of the sheet up against the sides of the block, means providing a yieldable pivotal connection between the side folding plates and the platform enabling the side folding plates to move outwardly from the sides of the platform in folding the sides of the sheet against blocks of various thicknesses, actuating means for swinging the side folding plates upwardly against the sides of the block, top folding plates pivotally connected to the edges of the side folding plates and operable by said means for folding the sheet over the top of the block, and an adhesive applying means carried by one of said top folding plates for applying adhesive between the lapped edges of the sheet on top of the block.

12. In an ice wrapping machine, means providing a platform, means for positioning a sheet of wrapping paper thereon, means for positioning a block of ice on the sheet, side folding plates for folding the sides of the sheet up against the sides of the block, means providing a yieldable pivotal connection between the side folding plates and the platform enabling the side folding plates to move outwardly from the sides of the platform in folding the sides of the sheet against blocks of various thicknesses, actuating means for swinging the side folding plates upwardly against the sides of the block, and end folding plates hingedly connected to the sides of the side folding plates operable by said actuating means to fold the ends of the upwardly folded sides against the ends of the block.

13. In an ice wrapping machine, a platform, means for positioning a sheet of wrapping paper thereon, means for positioning a block of ice on the paper, side folding plates mounted at the sides of the platform for swinging movement to fold the paper up against the sides of the block, a crosshead slidable upon each side folding plate, top folding plates hingedly connected to the side folding plates, means resisting movement of the crosshead relatively to the side folding plates, means operable by movement of the crossheads for swinging the top folding plates over the top of the block, and means operable upon each crosshead to cause the crosshead to first lift the side folding plates against the sides of the block and then upon movement of the crosshead relatively to the side folding plates to cause the top folding plates to swing downwardly over the top of the block.

14. In an ice wrapping machine, a platform, means for positioning a sheet of wrapping paper thereon, means for positioning a block of ice on the paper, side folding plates mounted at the sides of the platform for swinging movement to fold the paper up against the sides of the block, a crosshead slidable upon each side folding plate, end folding plates hingedly mounted at the sides of the side folding plates, means resisting movement of the crosshead relatively to the side folding plates, means operable by movement of the crosshead relative to the side folding plates for swinging the end folding plates at right angles thereto, and means for moving the crosshead to cause the crosshead to first lift the side folding plates against the sides of the block and then upon movement of the crosshead relatively thereto to swing the end folding plates against the ends of the block.

15. In an ice wrapping machine, a platform, means for positioning a sheet of wrapping paper thereon, means for positioning a block of ice on the paper, side folding plates mounted at the sides of the platform for swinging movement to fold the paper up against the sides of the block, a crosshead slidable upon each side folding plate, top folding plates hingedly connected to the side folding plates, end folding plates hingedly connected to the sides of the side folding plates, means resisting movement of the crosshead relatively to the side folding plates, and means operable by movement of the crossheads for swinging the top folding plates over the top of the block and for swinging the end folding plates against the ends of the block, and means operable upon each crosshead to cause the crosshead to first lift the side folding plates against the sides of the block and then upon movement of the crosshead relatively to the side folding plates to cause the top folding plates to swing downwardly over the top of the block and to cause the end folding plates to swing against the ends of the block.

16. In an ice wrapping machine, a platform, means for positioning a sheet of wrapping paper thereon, end folding plates hingedly connected to the ends of the platform, side folding plates hingedly connected to the sides of the platform, top folding plates hingedly connected to the side folding plates, end folding plates hingedly connected to the sides of the side folding plates, means for swinging the side folding plates upwardly against the sides of a block placed on the platform, means for swinging the top folding plates over the top of the block, and means for swinging the end folding plates against the ends of the block.

17. In an ice wrapping machine, a platform, means for positioning a sheet of wrapping paper thereon, end folding plates hingedly connected to the ends of the platform, side folding plates hingedly connected to the sides of the platform, top folding plates hingedly connected to the side folding plates, end folding plates hingedly connected to the sides of the side folding plates, means for swinging the side folding plates upwardly against the sides of a block placed on the platform, means for swinging the top folding plates over the top of the block, means for swinging the end folding plates against the ends of the block, adhesive applying means carried by one of the top folding plates for applying adhesive between the lapped edges of the sheet on the top of the block, and adhesive applying means carried by the other side folding plate for applying adhesive between the folded portions of the sheet at the ends of the block.

18. In an ice wrapping machine, a platform, means for positioning a sheet of wrapping paper thereon, means for positioning a block of ice on the platform over the wrapping paper, side folding plates mounted for swinging movement up against the sides of the block, top folding plates hingedly connected to the side folding plates, end folding plates hingedly connected to the ends of the side folding plates, means for causing the side folding plates to fold the paper up against the sides of the block, the top folding plates to fold the paper over the top of the block, and the end folding plates to fold the projecting ends of the sides of the wrapped paper against the ends of the block, adhesive applying means carried by one of the top folding plates for applying adhesive between the lapped portions of the paper on top of the block, adhesive applying means for applying adhesive to the projecting portions of the top of the wrapped paper and folding it downwardly against the ends of the block, and means for folding the projecting portions of the bottom of the lapped paper up against the ends of the block over the downwardly folded projecting portions of the top of the wrapped paper.

19. In an ice wrapping machine, a platform, means for positioning a sheet of wrapping paper thereon, means for positioning a block of ice on the wrapping paper, means for folding the sides of the sheet against the sides of the block and folding the tops of the sides over the top of the block, means for applying adhesive between the overlapped portions of the tops, means for folding the projecting portions of the sides of the sheet against the ends of the block, means for folding the projecting portions of the tops of the sheet down against the ends of the block and applying adhesive thereto, and means for folding the projecting portions of the bottom of the folded sheet up over the downwardly bent portions of the tops of the folded sheet.

20. In an ice wrapping machine, a platform, means for folding a sheet of wrapping paper around a block of ice placed thereon, said means including plates, an adhesive applying means mounted upon one of the plates, and means for causing the adhesive applying means to move relatively to the plate while the plate is in paper folding position and causing the adhesive applying means to engage and fold a portion of the paper and apply adhesive thereto.

21. In an ice wrapping machine, a platform, means for positioning a sheet of wrapping paper thereon, folding plates around the platform for folding the sheet around a block of ice positioned thereon, a spring urged plate adjacent one of the plates adapted to be moved downwardly into engagement with the paper by the weight of a block of ice passing thereover but urged into spaced relation from said plate, and means for moving a block of ice over the plate onto the platform.

22. In an ice wrapping machine, a platform, means for consecutively moving blocks of ice from in front of the platform onto the platform, means for drawing a sheet of wrapping paper from a source of supply across the platform, means actuated by a block of ice as it moves onto the platform to temporarily clamp for the forward edge of the wrapping paper to the platform, means for cutting the sheet from the source of supply, and means for wrapping the cut sheet about the block of ice.

23. In an ice wrapping machine, a platform, means for consecutively moving blocks of ice from in front of the platform onto the platform, means for drawing a sheet of wrapping paper from a source of supply across the platform, means actuated by a block of ice as it moves onto the platform to temporarily clamp the forward edge of the wrapping paper to the platform, said clamping means comprising a hinged plate having a forward edge adapted to engage the platform and a spring tending to move the plate out of engagement with the platform, means for cutting the sheet from the source of supply, and means for wrapping the cut sheet about the block of ice.

24. In an ice wrapping machine, means providing a platform, means for positioning a sheet of paper thereon, means for positioning a block of ice on the sheet, side folding means for folding the sides of the sheet up against the sides of the block, said side folding means being yieldable with respect to the sides of the platform enabling the side folding means to move outwardly to accommodate blocks of various thicknesses.

MAXWELL T. ZEIGLER.